May 14, 1940.                E. G. GAYNOR                2,200,599
                         REFRIGERATOR CONTROL
                    Filed Jan. 19, 1937        2 Sheets-Sheet 1
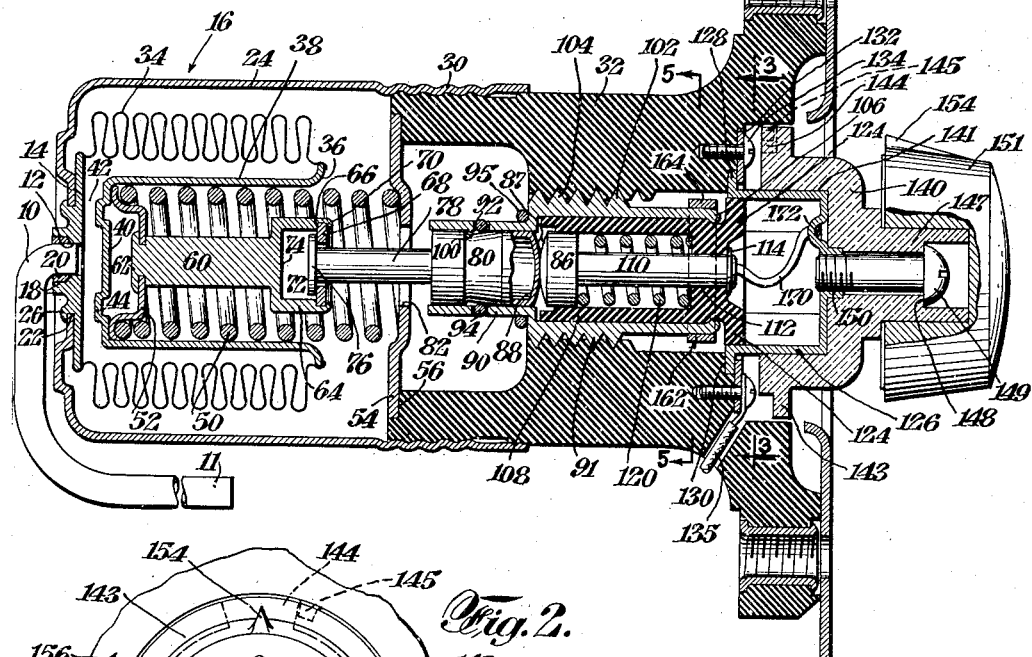
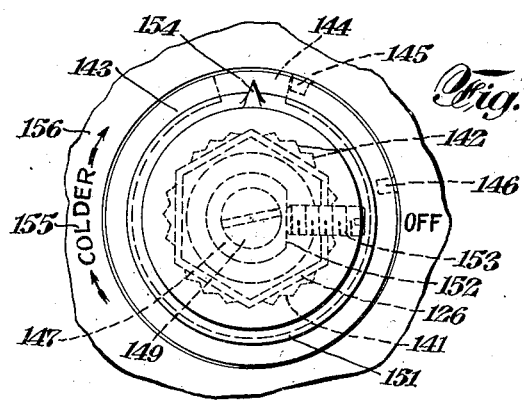
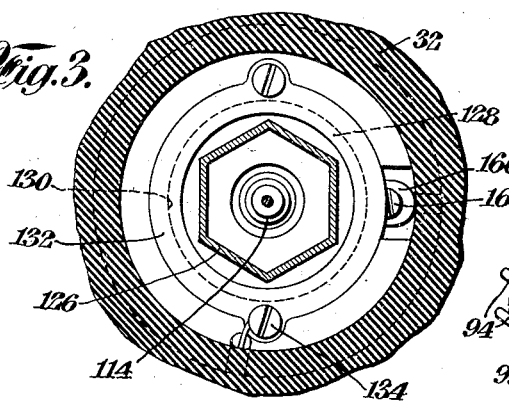
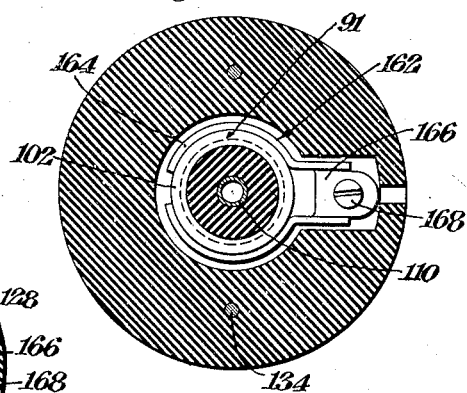
INVENTOR
Edwin G. Gaynor
BY Kenyon & Kenyon
ATTORNEYS

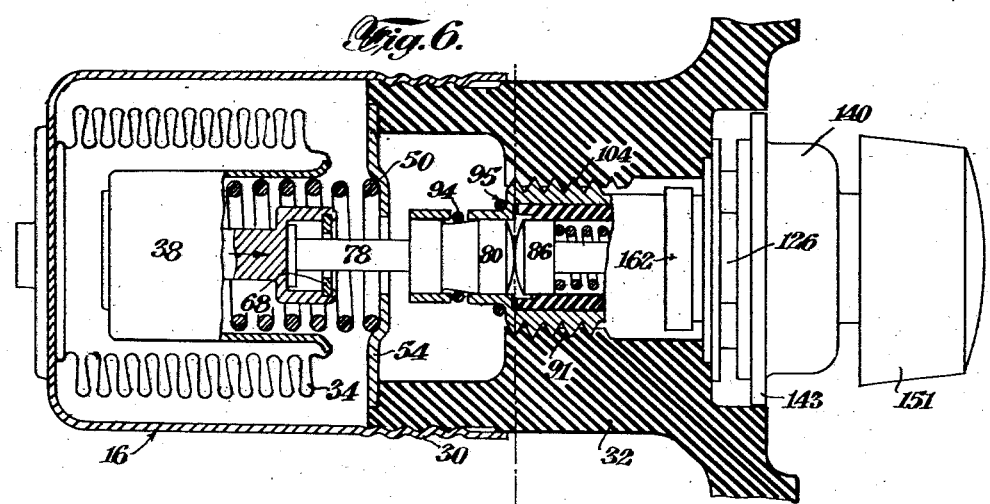
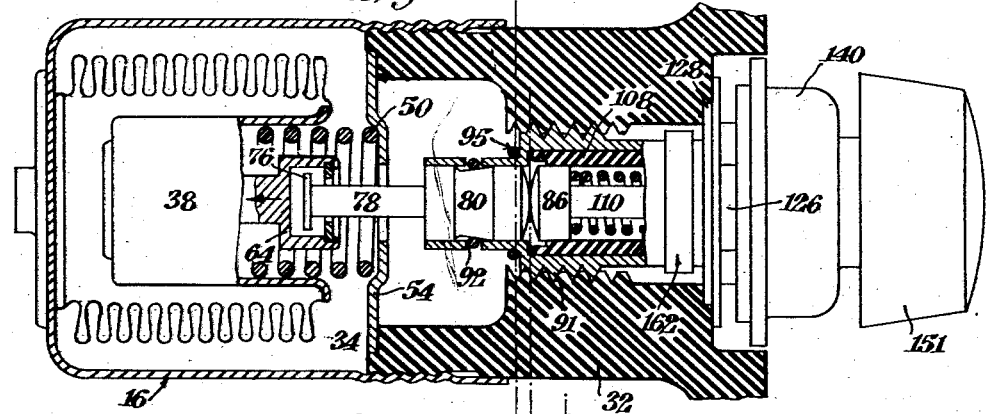
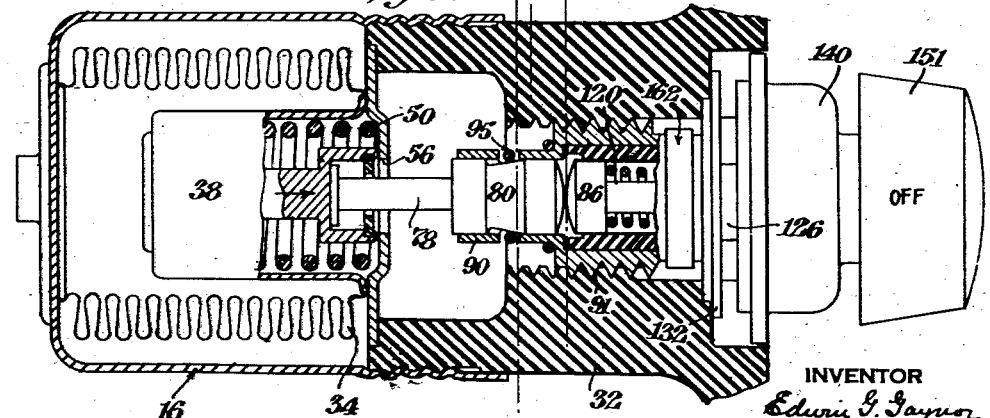

Patented May 14, 1940

2,200,599

UNITED STATES PATENT OFFICE 2,200,599

REFRIGERATOR CONTROL

Edwin G. Gaynor, Fairfield, Conn.

Application January 19, 1937, Serial No. 121,275

8 Claims. (Cl. 200—83)

This invention relates to means for controlling and regulating the temperature in refrigerating systems and the like.

Prior devices have used snap switches or toggle switches actuated by bellows and in which the bellows was actuated by changes in pressure in the bellows. I have replaced the conventional switches by electrodes or contacts which are brought into or withdrawn from contact with a slowness hitherto unassociated with electrodes located in A. C. motor circuits having a voltage up to about 250 volts. Also I have stressed the volume change in the bellows rather than the pressure change as the meter of the temperature to be controlled. The bellows and one electrode or contact are associated to make and break contact as the bellows expands or contracts. Temperature responsive means other than bellows may be used.

The connection between the bellows and the contact or electrode provides a slack movement so that when the bellows expands and moves in one direction, no movement is given to the electrode or contact until the bellows moves a predetermined amount and then the electrode is moved and contact is made, and when the bellows contracts and moves in the opposite direction, no movement is given to the electrode or contact until the bellows moves a predetermined amount and then the contact or electrode is withdrawn and the contact broken. The slack allows the electrodes to stay in or out of contact and disconnected from the bellows or other thermostatic element while the temperature changes a predetermined amount. In this way there is a time lapse between making and breaking the circuit and this is one of the important features of my invention. I have also provided a construction whereby the electrode which is associated with the bellows moves in and out of contact at a speed proportionate to that of the thermostatic element when the bellows is moving the electrode in either direction.

A device made according to my invention provides a very simple control and electrical contacting means for positively and accurately controlling the temperature in refrigerators.

In the drawings:

Fig. 1 represents an enlarged longitudinal cross-section of a thermostatic unit adapted for use in controlling a motor circuit for a refrigerator compressor or the like;

Fig. 2 represents a front elevation of the unit showing the operating knob and associated parts;

Fig. 3 represents a vertical transverse cross-section taken on line 3—3 of Fig. 1;

Fig. 4 represents a perspective view of the brake or spring device for one of the electrodes;

Fig. 5 represents a vertical transverse cross-section taken on line 5—5 of Fig. 1;

Fig. 6 represents the positions of the parts when contact is made between the electrodes;

Fig. 7 represents the parts in another position with the adjustable electrode moved to the right so that the temperature range of the refrigerator evaporator is about 15° F. to 25° F. and with the bellows contracting; and Fig. 8 represents the position of the parts when the thermostatic unit is in off position.

Referring now to the drawings, the reference character 10 designates a small tube with its closed end portion 11 preferably placed in contact with the bottom of the exterior wall of the evaporator or cooler of a refrigerator. However, the tube end may be placed against the exterior wall of the evaporator or cooler at any suitable place. This tube contains methyl chloride. Other fluids may be used in place of methyl chloride, but methyl chloride is preferred by me. The tube 10 extends into the opening 12 in the bottom plate member 14 of the control device generally designated 16. The opening 12 is enlarged at 18 to receive solder or the like 20 for sealing the end of the tube to the bottom plate member 14. The bottom plate member 14 is received within opening 22 formed in the bottom of the lower casing 24 and has a portion spun over as at 26 to securely hold and seal the plate member within the bottom of the casing 24.

The casing 24 at its other end is provided with a rolled thread portion 30 which is threaded on the end of the housing member 32 of the control device. The housing member is of insulation material, such as "Bakelite."

Secured and sealed to the periphery of the plate member 14 is one end of the bellows 34 which is attached thereto by soldering or other suitable means. The other end of the bellows 34 is secured and sealed to the curved rim 36 of the cup or shell 38 by soldering or the like. When the bellows moves, the cup 38 is moved thereby. This cup 38 extends into the bellows but the bottom 40 of the cup is normally spaced from the plate member 14 as at 42. The bottom 40 of the cup is provided with projections 44 to permit the passage of fluid from the tube 10 around cup 38 in the event that the cup 38 would be moved down to contacting position with the plate 14.

By this construction a sealed space between the exterior of the cup 38, the interior of the bellows 34 and the tube 10 is provided for the methyl chloride and the bellows expands and contracts responsive to the vapor pressure in the tube 10. The bellows in this sealed space is charged with methyl chloride vapor. Instead of bellows I can use other temperature responsive means such as diaphragms or the like.

A main spring 50 is provided for creating a known pressure against which the vaporized methyl chloride must work, and the spring is so proportioned that the bellows elongates a certain length for each degree rise in the temperature of the evaporator or vice versa. The spring reduces the amount of movement of the bellows due to temperature changes. In the preferred form of my invention the spring is so selected to permit the bellows to move about .01 of an inch for every degree change in temperature of the evaporator in the refrigerator but I am not to be restricted to this construction. One end of the main spring 50 abuts the flanged member 52 mounted within cup 38 and which is held against the bottom 40 of the cup. The other end of the main spring 50 abuts against plate 54 which is held within an annular depression 56 formed in the member 32 to position the end of the spring.

Secured to the flanged member 52 is a piston or rod 60 which has its lower end spun over as at 62 to securely attach the piston 60 to the flanged member 52. The piston 60 has an enlarged hollow head 64, the enlarged head at its outer end being provided with a shoulder 66 to receive washer 68 which is held in position by spinning the enlarged head as at 70. The enlarged head 64 is hollowed out as at 72 and the bottom 74 of the hollow 72 forms the pushing end of rod 60 or one of the abutments for actuating the head 76 secured to the rod 78 of the one electrode 80 in one direction. The washer 68 forms the other abutment for actuating the head 76 on the rod 78 in the other direction. The head or flange 76 is positioned within the hollow 72 of the enlarged head 64. These abutments are spaced and the space 72 provides the time elapse between bellows movement and the contacts. This construction provides slack movement or a loose linkage or connection between the parts to accomplish the temperature interval. The rod 78 passes through opening 82 in the plate 54 against which the main spring 50 abuts. As the bellows is expanded and contracted, the cup 38, member 52 and piston 60 move therewith to actuate the movable electrode 80 in either direction.

The electrode 80 is the one which is moved by the contraction and expansion of the bellows 34. The electrode when actuated by the bellows during the operation of the apparatus is positively and slowly moved toward and away from the other electrode 86 in a straight line and contact is made between the electrodes or broken without using snap switches or other similar quick-acting switches and the bellows functions on changes in volume rather than changes in pressure. The electrodes 80 and 86 are preferably provided with convex faces 87 and hollows 88 behind the convex faces. The convex faces are preferably made of silver. The purpose of the convex faces and hollows will be later described. The electrode 80 is slidably received within a sleeve 90 which forms an integral part of the regulating screw 91. Sleeve 90 is provided with slots or openings 92 to receive the arms 94 of the spring member 95 shown in perspective in Fig. 4 of the drawings.

The spring member acts as a brake for electrode 80. This spring member is formed as a part of a circle 96 and has the bent-up parallel portions 98 and the arms 94 just described, the arms being bent at right angles to the portions 98. The circular portion 96 is positioned around the exterior of the sleeve 90 of screw 91 and the arms 94 are positioned in the slots or openings 92 to normally hold the electrode 80 in the position to which it is moved. The electrode 80 is provided with a conical surface 100 which cooperates with the arms 94 of the spring to urge the electrode 80 toward the other electrode 86. If there is any jarring of the control device, the spring or brake 95 will tend to move electrode 80 toward rather than from electrode 86. If the brake or spring 95 allows slippage, the electrode 80 will be urged toward the other electrode. It is important to have the contact 80 urged in this direction at all times.

With the contact or electrode 86 shown in the position in Fig. 1 the temperature of the refrigerator evaporator fluctuates ten degrees between about 6° F. and 16° F. By changing the position of electrode 86 as shown in Fig. 7, the ten degree range is from about 15° F. to 25° F. Electrode 86 may be changed to other positions to obtain the ten degree range between other limits. The regulating screw 91 which serves for adjusting the position of electrode 86 when different temperatures of the refrigerator and evaporator are desired will now be described. This regulating screw is enlarged as at 102 and is provided with threads 104 which are threadedly engaged with the internal threads formed in the member 32. One end of the portion 102 is spun over as at 106 to secure the tubular insulating liner 108 thereto. The electrode 86 is resiliently mounted within the insulating liner 108 and is insulated from the sleeve 90. The electrode 86 is provided with a rod 110 which extends through opening 112 in the end of the insulating liner 108, the other end of the rod 110 having a head 114 which abuts the material of the liner around the opening 112 and acts as a stop for the electrode. Positioned within the liner 108 and surrounding the rod 110 of the electrode 86 is a spring 120 which abuts the electrode at one end and the bottom of the liner 108 at its other end so as to resiliently support the electrode 86. The electrodes 80 and 86 are so mounted that vibrations or jars stress both electrodes equally.

The insulating liner 108 is provided at its one end with a hexagonal head 124 which fits within the rotatable cup-shaped member 126, the cup-shaped member also being hexagonal. The member 126 forms part of the manual adjustment means. Member 126 is provided with an annular flange 128 which is mounted in the depression 130 of the member 32 and held therein by an annular brush 132 and terminal screws 134. The brush is preferably dished to make a good electrical connection between it and the flange 128. The wire 135 is held against brush 132 by one of the screws 134.

Mounted on the member 126 is the manual post 140 made of insulating material, such as "Bakelite." The post 140 has a socket 141 provided with serrations 142 to fit over the corners of the hexagonal-shaped member 126. When the parts are being assembled, the serrations 142 provide means for assisting in adjusting the parts to desired position.

The manual post 140 has a flange 143 provided with a stop 144 which engages with a projection 145 on member 32. When the stop 144 abuts projection 145, the device is on in coldest position. Member 32 has another projection 146 in the path of stop 144 and when projection 146 and stop 144 are in engagement the device is in "off" position. The "off" position of the parts is shown in Fig. 8 and will be later described herein.

The manual post has an upstanding sleeve 147 and a shoulder 148. The post is secured to cup-shaped member 126 by a screw bolt 149 extending through sleeve 147 and threaded into the threaded opening 150 of member 126. Fitting over sleeve 147 is a knob 151 which engages a flat 152 on sleeve 147 and which is held thereon by a screw 153 (see Fig. 2).

Knob 151 has an indicator 154 which cooperates with indications or markings 155 on the plate 156 adapted to be secured in place over the annular flange 157 on member 32, the flange having spaced openings 158 whereby the control device and the plate 156 may be attached to a refrigerator wall or the like. The indications show "off" position and the direction for turning the knob to obtain colder temperatures.

Mounted on one end of the enlarged portion 102 of regulating screw 91 is a brush 162 having resilient arms 164 which embrace portion 102. The brush 162 has a base 166 having a hole for receiving terminal screw 168. (See Fig. 5.) The arm is secured to member 32. The regulating screw 91 is both rotatably and longitudinally movable with respect to arms 164. Longitudinal movement of screw member 91 also causes longitudinal movement of electrode 86.

Electrode 86 is provided with a wire 170 which is in contact with and secured to the cup-shaped member 126 as at 172. Cup-shaped member 126 through its flange 128 is in electrical contact with brush 132 and screws 134 through which the current passes from wire 135. The other electrode 80 is in electrical contact with the sleeve 90 and portion 102 through the brush 162. When the electrodes are in contact, an electrical circuit is formed and this circuit will now be given. Current enters through wire 135, passes through terminal 134, through brush 132, through cup 126, through wire 170 to electrode 86, then through electrode 80, through sleeve 90, through enlarged portion 102, through brush 162 and out through terminal 168.

As above pointed out my contacts of electrodes 80 and 86 are operated without snap movement switches which have heretofore been considered essential. Certain conditions, however, are necessary to prevent continued arcing. The arc space is considered as filled with streamers of positive and negative ions, which, if recombined or one or the other displaced to a fair extent, will leave the space with a high dielectric strength and this space will not reignite after the voltage has built up following the half cycle zero. I prefer to hollow out the inside of the contacts or electrodes adjacent their meeting or abutting ends as shown at 88 in Fig. 1. By making the contacts or electrodes hollow, the path of the current is generally at right angles to the path across the arc space and the magnetic field set up pulls the more mobile negative ions from that space.

The contacts or electrodes 80 and 86 are so proportioned and moved as to minimize any arc-restriking between the electrodes. These contacts or electrodes are effective, dependable, cheap to manufacture and have a long life. In the preferred form electrodes 80 and 86 are in coaxial arrangement, but other arrangements may be used provided the electrode 80 is moved positively in substantially a straight line when it is moved.

The operation of the device will now be given with the parts as shown in Fig. 1 and with the electrodes in contacting position. With the electric current on, the refrigerating motor in whose circuit the electrodes are placed is running and cooling is in progress. The bellows 34 is contracting and the piston 60 is being moved to the left in Fig. 1. The lower surface of washer 68 in head 64 of the piston 60 is just engaging the upper surface of abutment 76 on electrode 80. Further contraction of the bellows 34 occurs and the electrode 80 is drawn away from the other electrode 86 and the motor circuit will be opened and refrigeration ceases. But before complete cessation occurs, the bellows will have contracted further due to the lag between the stopping of the motor and its effect on the tube 10 on the cooler. Due to this further contraction, the electrodes will be sufficiently separated and the separation will be maintained by brake 95 acting against electrode 80.

Since the motor has stopped pumping refrigerant into the cooler, refrigeration has ceased, the cooler warms up, and the bellows 34 expands and moves piston 60 to the right. The pushing end or abutment 74 within hollow head 64 of piston 60 moves to the right until it presses against the lower surface of head 76 of electrode 80 and continues to move to the right until the electrodes are brought into contact, and due to the starting of the motor, refrigeration is felt at the junction of the cooler and the tube 10. There is a lag here similar to the one above described and the contact or electrode 86 is provided with a resilient abutment member in the form of spring 120, and this lag causes the electrodes to come into firm contact. The brake 95 maintains the contacting relation between the electrodes until the electrodes are separated by the contracting bellows on the next cooling operation. It is to be observed, however, that before the piston engaged the head 76 on electrode 80 there was a space or slack 72 to be traversed. It is evident that after the electrodes have been brought together, there is this same slack or space 72 to be traversed before the piston brings the electrodes apart. Since the travel of the piston corresponds to the degrees of temperature range of the cooler, a number of degrees rise and fall must occur between the successive engagements of the piston with the head 76 on the electrode 80 to cause the electrodes to meet or to part. The movement of the piston per degree change in temperature in the tube 10 is a function of the main spring 80. The amount of slack or space 72 is suited to the particular need.

In the above operation the electrodes are parted when the temperature falls to about 6° F. in the cooler and the temperature will have to rise to about 16° F. in the cooler before the electrodes will be brought together. The cycling to effect this temperature change of ten degrees continues and the refrigeration cycle of 6° F. to 16° F. will be repeated until the position of electrode 86 is manually changed. This changing of electrode 86 is done by turning knob 151 counter-clockwise as shown in Fig. 2. The effect will be to move the upper electrode to the right in Fig. 1 through manual post 140, cup member 126, head 124 on insulating liner 108 and screw 91. By moving electrode in this way a higher temperature than 16° F. will be necessary before electrode 80 will meet electrode 86, for example 22° F. The slack or space 72 as above is equivalent to ten degrees F., and the electrodes will be parted at 12° F. which is ten degrees under the assumed 22° F. This cycle will continue and be repeated until the position of electrode 86 is again changed. It will be noted that the average temperature of the cycle (22 plus 12 divided by 2) is higher than that of the previous assumed cycle (16 plus 6 divided by 2) and therefore a change of temperature in the refrigerator is effected by operating knob 151. The position of the parts is indicated by the indicator 154 on knob 151.

In manufacturing and assembling the unit, the manual post 140 is left off while the electrodes are brought together at a definite position and at a definite known temperature of the temperature responsive means. The post 140 is then assembled on the cup member 126 and by taking advantage of the serrations 142 in the socket of post 140 with respect to the corners of the hexagonal member 126, a position of post 140 and later knob 151, can be found so that a definite position of the knob will correspond to a definite temperature of the evaporator or cooler and the indicator 154 set to correct position.

In Fig. 8 I have shown the unit in off position. This condition is obtained by rotating knob 151 in a counter-clockwise direction (Fig. 2) to off position so that the electrode 86 assumes the position shown in Fig. 8. As the refrigerator warms up, the bellows 34 expands and piston 60 and head 64 are moved toward plate 54 until head 64 abuts the plate 54. No further movement can then be given to electrode 80 and is not moved far enough to contact electrode 86.

In Fig. 7 I have shown the unit during cooling and with the bellows contracting. The electrodes 80 and 86 are shown in contacting position. When the bellows will have contracted further washer 68 on head 64 on piston 60 will strike head 76 on abutment 68 and the electrodes will be separated.

A device made according to my invention may be used with and is especially adapted for use with refrigerators, water coolers, and other systems where it is desired to keep a confined space between predetermined limits of temperature. When the desired range is known, the bellows and associated parts are adjusted to function in this range which need not be a cold range. My electrodes will operate on any normal range of temperatures, and therefore, I do not wish to limit the use of my electrodes to refrigerating systems.

What I claim is:

1. A device of the character described including a mounting, a stationary electric contact and a movable electric contact on said mounting, the adjacent ends of said electrodes both having substantial area, being of substantially the same shape at said ends, and being hollow directly behind said ends whereby electric curent may be directed across the faces of said ends substantially at right angles to the axial direction of said electrodes, actuating means to move said movable contact slowly into and out of contact with said other contact and a loose and slack connection between said movable contact and said actuating means adapted to leave said movable contact unmoved for a certain predetermined amount of movement of said actuating means.

2. A thermostatic control including a mounting, a manually adjustable electric contact for regulating the temperature in a space to be refrigerated, a thermostatic element, a movable electric contact, means to join said movable contact with said thermostatic element, a counterbalancing spring to regulate the movement per degree of said thermostatic element, said joining means including a construction providing for slack and loose movement between said thermostatic element and said movable contact, said loose and slack movement being so admeasured that a movement of said thermostatic element corresponding to a change of at least 10° F. is required to move said movable contact, whereby said movable contact is slowly moved for only a portion of the movement of said thermostatic element and only after said thermostatic element has been moved by a temperature change of at least 10° F.

3. In combination, a thermostatic control comprising a housing, a charged bellows mounted in said housing, a counterbalancing spring, said spring being associated with said charged bellows to control the movement per degree of temperature of the bellows, a contact operating means mounted on said bellows a movable contact, means permitting a slack movement between said bellows and movable contact to give a predetermined cyclic movement of the control, an electric circuit, contact terminals, a manually operated temperature control regulating means, a contact mounted in said regulating means, the slack movement being so admeasured as to leave the movable contact dormant during a temperature range of at least 10° F. of the predetermined cycle and the control movement of the bellows before making and breaking the circuit at the high and low temperatures of the cycle.

4. A thermostatic unit adapted to actuate electrical contacts and which includes a housing, a bellows therein, a cup secured to said bellows and actuated thereby, a spring between said cup and a stationary part of said housing to permit a certain movement per degree change of temperature in said bellows, a member actuated by said cup as the bellows contracts and expands, said member having a plurality of spaced abutments, a stationary contact, a slidable contact having a head adapted to be actuated by said abutments, one of said abutments moving said head and contact in one direction to bring said contacts together to close the circuit after said bellows expands a certain amount, and the other of said abutments acting to move said head and contact in the other direction to separate said contacts after said bellows contracts a certain amount.

5. A thermostatic unit adapted to actuate electrical contacts and which includes a housing, a bellows therein, a cup secured to said bellows and actuated thereby, a member actuated by said cup as the bellows contracts and expands, said member having a plurality of spaced abutments, a stationary contact, a slidable contact having a head adapted to be actuated by said abutments, one of said abutments moving said head and contact in one direction to bring said contacts together to close the circuit while said bellows expands, and the other of said abutments acting to move said head and contact in the other direction to separate said contacts while said bellows contracts, the spacing between abutments being so admeasured that said slidable contact is moved only during certain portions of the movement of said member.

6. A thermostatic unit adapted to actuate electrical contacts and which includes a housing, an expansible and contractible bellows therein, a stationary contact and a movable contact, and means actuated by said bellows for moving said movable contact toward and away from said stationary contact, said means including a movable member having a plurality of spaced abutments, said slidable contact having a head adapted to be actuated by said abutments, one of said abutments being operable to move said head and contact in one direction to bring the contacts together to close the circuit as the bellows expands, and the other of said abutments being operable to move said head and contact in the other direction to separate said contacts as the bellows contracts, the spacing between said abutments being so admeasured that said movable contact is moved only during certain portions of the movement of said member.

7. A device of the character described, including, in combination, a pair of contacts in said housing and arranged coaxially, a bellows member responsive to temperature changes in a space to be refrigerated, and means associated with said bellows members for actuating one of said contacts as the bellows member contracts and expands, said means including a movable member having spaced abutments, one abutment moving said contact in one direction to bring said contacts together as the bellows member expands and the other abutment moving said contact in the other direction to separate said contacts as said bellows member contracts, and means for holding said movable contact in position when said movable contact is not being actuated by said abutments.

8. A device of the character described including, in combination, a housing, a pair of coaxially arranged contacts therein, one of said contacts being slidable and the other contact being adjustable to various positions, a bellows in said housing, a member actuated by the expansion and contraction of said bellows for moving said slidable contact, said member having a plurality of abutments, one of said abutments moving said contact in one direction to move the slidable contact toward the other contact as the bellows expands, and the other abutment acting to move said slidable contact in the other direction to separate the contacts as said bellows contracts, said abutments being spaced apart so that said slidable contact is moved only during certain portions of the movement of said bellows actuated member, and means whereby said adjustable contact may be moved to different positions.

EDWIN G. GAYNOR.